US006973182B1

(12) United States Patent
Aude

(10) Patent No.: US 6,973,182 B1
(45) Date of Patent: Dec. 6, 2005

(54) DIFFERENTIAL ECHO CANCELLATION RECEIVER WITH DYNAMIC CANCELLATION OF EXCESS DC OUTPUT CURRENT

(75) Inventor: Arlo Aude, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 440 days.

(21) Appl. No.: 10/385,052

(22) Filed: Mar. 10, 2003

(51) Int. Cl.[7] .................... H04M 1/00
(52) U.S. Cl. ............. 379/399.01; 379/402; 379/390.04
(58) Field of Search .................... 379/399.01, 402, 379/390.04, 403

(56) References Cited

U.S. PATENT DOCUMENTS 6,370,245 B1 * 4/2002 White .................. 379/390.04

* cited by examiner

*Primary Examiner*—Jefferey F. Harold
(74) *Attorney, Agent, or Firm*—Vedder Price Kaufman & Kammholz, P.C.

(57) ABSTRACT

Differential echo cancellation receiver circuitry with dynamic cancellation of excess DC output current. Differential input circuitry provides for cancellation of incoming DC voltage and the incoming transmit signal echo while passing the receive signal. Excess DC current appearing in the input circuitry as part of the incoming DC voltage and echo signal cancellation is shunted away from the output circuitry with dynamically biased current shunting circuitry that tracks changes in the DC current within the input circuitry.

20 Claims, 3 Drawing Sheets

DIFFERENTIAL ECHO CANCELLATION RECEIVER WITH DYNAMIC CANCELLATION OF EXCESS DC OUTPUT CURRENT

BACKGROUND OF THE INVENTION

1. Field of the Invention

The present invention relates to differential circuits on which bidirectional signals, e.g., transmit and receive communication signals, are simultaneously conveyed, and in particular, to differential receiver circuits for canceling the transmit echo signal.

2. Description of the Related Art

Differential circuits used for conveying multiple signals simultaneously have many applications. One common application might be that of the subscriber line interface circuit (SLIC) used in telecommunications in which the pair of wires ("tip" and "ring") forming a subscriber telephone line is responsible for conveying both the incoming and outgoing signals (e.g., voice, facsimile or data signals).

The problem with such circuits involves distinguishing between the incoming, or receive, signal and the outgoing, or transmit, signal, the latter often being referred to as the echo signal (so-called due to its reception by the receiver circuitry during its transmission by the transmitter circuitry). Accordingly, echo cancellation receiver circuits have been developed to cancel out the returning transmit signal while allowing the desired receive signal to pass and be appropriately processed.

Referring to FIG. 1, a conventional echo cancellation circuit 10 includes an input stage 12, an intermediate stage 14 and an output stage 16. The input stage 12 is implemented using a matrix of resistive circuit elements, e.g., resistors R1*p*, R1*n*, R2*p*, R2*n*, R3*p* and R3*n*, interconnected substantially as shown between the differential signal lines 1*p*, 1*n* and the power supply voltage VDD. Resistors R3*p* and R3*n* are controlled together through some form of simultaneous control mechanism 13 (many types of which are well known to one of ordinary skill in the art). Circuit nodes 3*p* and 3*n*, at the junctions of resistors R2*p* and R3*p* and R2*n* and R3*n*, respectively, are also driven by current sources 18*p*, 18*n* such that a common mode current Icm and a differential replica signal current Itx, corresponding to and opposite in phase to the incoming echo transmit signal Vtransmit, is applied with the positive replica signal phase Itxp applied at node 3*n* and the negative replica signal phase Itxn applied at node 3*p*.

The incoming signal Vin, received via the differential signal lines 1*p*, 1*n*, includes a DC component (e.g., corresponding to the power supply voltage VDD), plus the transmit Vtransmit and receive Vreceive signal voltage, and are applied at the input terminals rxp, rxn. With the replica signal currents applied at terminals txn and txp and proper adjustment of resistors R3*p* and R3*n*, the sum of the various currents in resistors R1*p* and R2*p* effectively eliminate currents corresponding to the incoming echo transmit signal, thereby leaving only signal currents corresponding to the incoming receive signal Vreceive. These signal current components form the positive I1*p* and negative I1*n* differential current phases of the current signal conveyed by the intermediate stage 14 to the output stage 16.

The intermediate stage 14 includes two current control circuits implemented with operational amplifier circuits OP1*p* and OP1*n* and P-type metal oxide semiconductor field effect transistors (P-MOSFETs) M1*p* and Mn, interconnected as shown. With the DC reference voltage VDD-Vref applied at the non-inverting terminals of the operational amplifier circuits OP1*p*, OP1*n*, the voltages, both AC and DC, at circuit nodes V1*p* and V1*n* are held constant at such DC reference voltage VDD-Vref due to the feedback loops formed by the interconnection of these circuits OP1*p*, OP1*n* and transistors M1*p*, Mn. Accordingly, the differential voltage V1, appearing at the input to the intermediate stage 14, is zero.

The output stage 16 is implemented using a differential operational amplifier circuit OP2 having non-inverting and inverting input terminals connected to circuit nodes V2*p* and V2*n*, respectively. Its non-inverting and inverting output terminals are connected to its inverting and non-inverting input terminals via resistors R4*n* and R4*p*, respectively, to form negative feedback loops and provide the positive Vop and negative Von signal phases of the differential output signal Vo. The AC voltages at the input terminals V2*p*, V2*n* are held constant by such negative feedback loops around operational amplifier circuit OP2, thereby causing its differential input voltage V2 to be zero. The DC voltage components of the output signal voltage phases Vop, Von are held constant at the common mode output voltage Vcmo by negative feedback loops within the op amp circuit OP2, thereby causing the DC differential voltage component of the output signal Vo to be zero. Accordingly, the output signal VO is produced by the output current components Itp, Itn, flowing through the feedback resistors R4*p*, R4*n* and corresponding to the intermediate signal current phases I1*p*, I1*n*, respectively, and, therefore, represent the incoming receive signal Vreceive.

As indicated below, corresponding input resistors R1*p* and R1*n*, R2*p* and R2*n*, R3*p* and R3*n*, and R4*p* and R4*n* are equal, and transistors M1*p* and M1*n* are alike. The total current It flowing trough resistor R4 (i.e., current Itp through resistor R4*p* and current Itn through resistor R4*n*) can be calculated using Equation 6. Based upon the foregoing discussion, it should be evident that signals Itx (representing either current Itp or Itn, depending upon the subject circuit branch), Vtransmit and Vreceive are AC (i.e., time-varying) signals, while signals Icm, Vcm, Vref and VDD are DC (i.e., static) signals. Accordingly, the total current can be viewed as having two separate components: a DC, or static, current component, and an AC, or time-varying, current component, designated as Itdc (Equation 7)and Itac (Equation 8), respectively.

$$R1p=R1n=R1 \tag{1}$$

$$R2p=R2n=R2 \tag{2}$$

$$R3p=R3n=R3 \tag{3}$$

$$R4p=R4n=R4 \tag{4}$$

$$M1p=M1n=M1 \tag{5}$$

$$It=\frac{Vin}{R1}+\frac{Vref}{R1}+\frac{Vref}{R3+R2}-\frac{Icm\cdot R3}{R3+R2}-\frac{Itx\cdot R3}{R3+R2} \tag{6}$$

$$It_{dc}=\frac{Vref}{R1}+\frac{Vref}{R3+R2}-\frac{Icm\cdot R3}{R3+R2} \tag{7}$$

$$It_{ac}=\frac{Vin}{R1}-\frac{Itx\cdot R3}{R3+R2} \tag{8}$$

It should be noted that the DC current component is not zero and is dependent upon the value of resistor R3. Such excess DC current flows through the output resistors R4 (R4*p* and R4*n*) and will cause the DC input voltage V2 at the input of the operational amplifier circuit OP2 to vary as indicated by Equation 9.

$$V_{2dc} = VCMO + R4 \cdot \left[ \frac{Vref}{R1} + \frac{Vref}{R3 + R2} - \frac{Icm \cdot R3}{R3 + R2} \right] \quad (9)$$

Depending upon how large this excess DC current becomes, it can become suboptimal or impossible to provide correct biasing at the input terminals of the operational amplifier OP2 such that transistors M1*p* and M1*n* are maintained in saturation (so as to provide maximum impedance at their respective drain terminals). This becomes increasingly problematic as lower power supply voltages are used for biasing the receiver circuitry 10. For example, for a three volt power supply voltage VDD, the output common mode voltage Vcmo will be 1.5 volts. With a common mode current Icm of only 100 microamps and a typical value of 30 kilohms for the output resistors R4, three volts will appear across the output resistors R4, thereby leaving no headroom for the output signal voltage Vo.

Referring to FIG. 1A, application of this common mode current Icm and differential replica signal current Itxp-Itxn can be implemented as shown. The receiver circuitry 10*a* and transmitter circuitry 20 share common connections at the differential signal lines 1*p*, 1*n*, with the transmitter 20 providing the outgoing transmit signal 21. This transmit signal 21 is also applied to a voltage-to-current converter 22 which provides the differential replica transmit signal current Itx 23. A common mode current source 24 provides a current signal 25 corresponding to the common mode current Icm. These current signals 23, 25 are combined in a current summing circuit 26 to provide the differential replica signal current 27 Icm+Itx, Icm−Itx.

SUMMARY OF THE INVENTION

In accordance with the presently claimed invention, differential echo cancellation receiver circuitry provides dynamic cancellation of excess DC output current. Differential input circuitry provides for cancellation of incoming DC voltage and the incoming transmit signal echo while passing the receive signal. Excess DC current appearing in the input circuitry as part of the incoming DC voltage and echo signal cancellation is shunted away from the output circuitry with dynamically biased current shunting circuitry that tracks changes in the DC current within the input circuitry.

In accordance with one embodiment of the presently claimed invention, differential echo cancellation receiver circuitry with dynamic cancellation of excess DC output current includes resistive input circuitry, current control circuitry, differential amplifier circuitry and bias signal generator circuitry. The resistive input circuitry responds to reception of a DC power voltage, a differential input signal, a common mode DC current and a differential replica signal current by providing a first intermediate differential signal. The differential input signal includes a DC input signal component corresponding to the DC power voltage, a transmit signal component and a receive signal component. The differential replica signal current corresponds and is opposite in polarity to the transmit signal component. The first intermediate differential signal includes a first differential signal current corresponding to the receive signal component and substantially zero transmit signal component, and first and second differential DC current phases. The current control circuitry, coupled to the resistive input circuitry, responds to reception of a DC reference voltage, a replica bias signal and the first intermediate differential signal by providing a second intermediate differential signal including a second differential signal current corresponding to the first differential signal current, and first and second shunt DC currents. The differential amplifier circuitry, coupled to the current control circuitry and including differential negative feedback circuitry coupled between first and second differential input terminals and first and second differential output terminals, responds to reception of the second intermediate differential signal via the first and second differential input terminals by providing a corresponding differential output signal via the first and second differential output terminals. The bias signal generator circuitry, coupled to the current control circuitry, responds to reception of the DC power voltage, the DC reference voltage, and a replica DC current substantially equal to the common mode DC current by providing the replica bias signal, wherein the replica bias signal tracks changes in the first and second differential DC current phases such that the first and second shunt DC currents are substantially equal to the first and second differential DC current phases, respectively.

In accordance with another embodiment of the presently claimed invention, differential echo cancellation receiver circuitry with dynamic cancellation of excess DC output current includes a power terminal, input terminals, differential input circuitry, current cancellation circuitry, differential amplifier circuitry and bias signal generator circuitry. The power terminal is to convey a DC power voltage. The input terminals is to convey a differential input signal including a DC input signal component corresponding to the DC power voltage, a transmit signal component and a receive signal component. The differential input circuitry, coupled to the power terminal and the input terminals, responds to reception of the DC power voltage, the differential input signal, a common mode DC current, and a differential replica signal current corresponding and opposite in polarity to the transmit signal component by providing a first intermediate differential signal including a first differential signal current corresponding to the receive signal component and substantially zero transmit signal component, and first and second differential DC current phases. The current cancellation circuitry, coupled to the differential input circuitry, responds to reception of a DC reference voltage, a replica bias signal and the first intermediate differential signal by providing a second intermediate differential signal including a second differential signal current corresponding to the first differential signal current, and third and fourth differential DC current phases. The differential amplifier circuitry, coupled to the current cancellation circuitry and including differential negative feedback circuitry coupled between first and second differential input terminals and first and second differential output terminals, responds to reception of the second intermediate differential signal via the first and second differential input terminals by providing a corresponding differential output signal via the first and second differential output terminals. The bias signal generator circuitry, coupled to the power terminal and the current cancellation circuitry, responds to reception of the DC power voltage, the DC reference voltage, and a replica DC current substantially equal to the common mode DC current by providing the replica bias signal, wherein the replica bias signal tracks changes in the first and second differential DC current phases such that the third and fourth differential DC current phases are substantially zero.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators.

Figure 1:
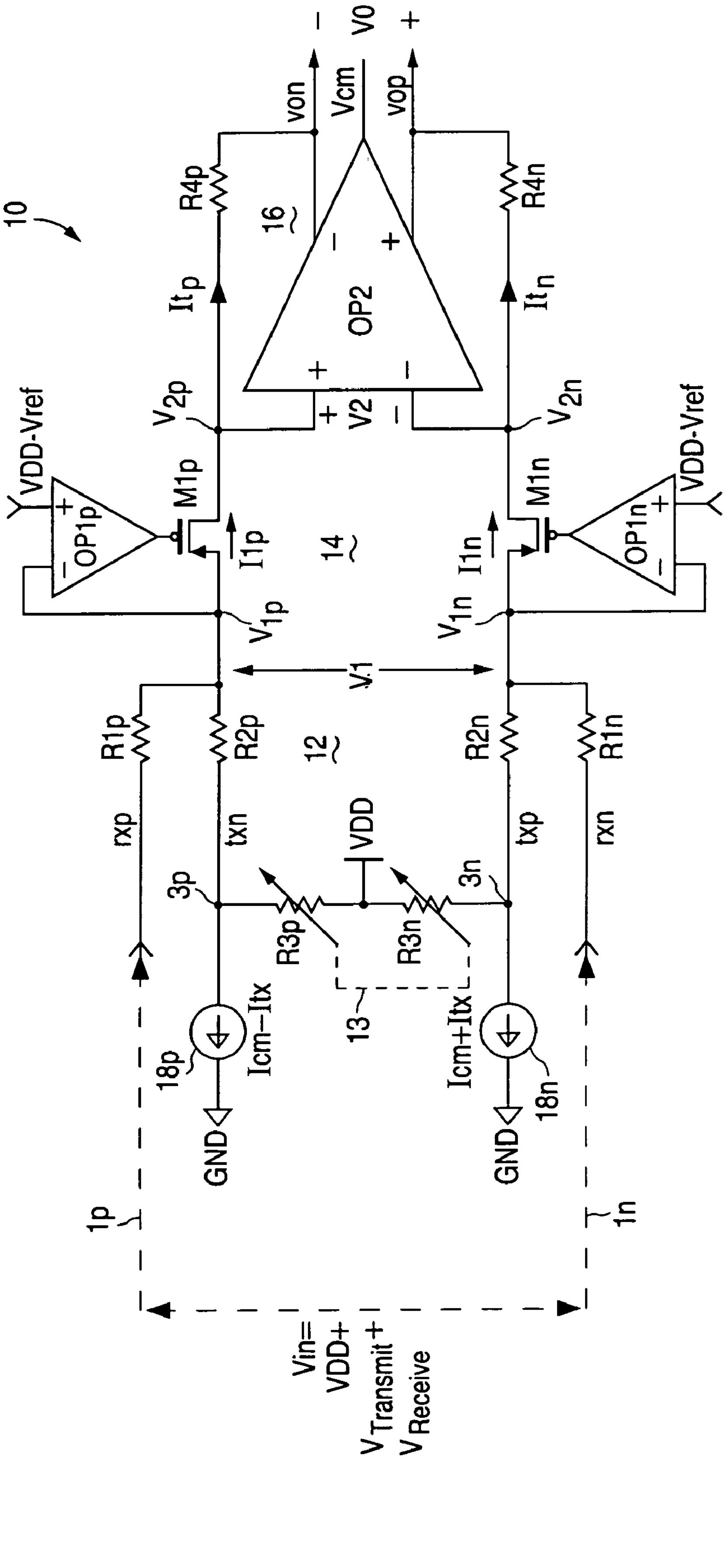
FIG. 1 is a schematic circuit diagram for a conventional differential echo cancellation receiver circuit.
Figure 1A:
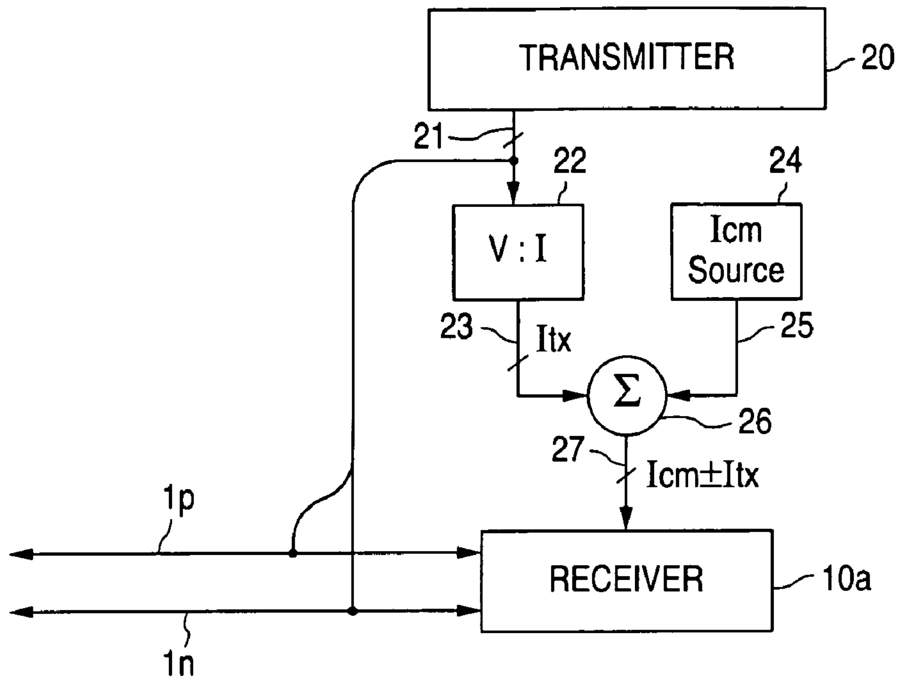
FIG. 1A is a block diagram of circuitry used to provide the common mode and differential replica signal currents for biasing the input stage of the receiver circuit of FIG. 1.
Figure 2:
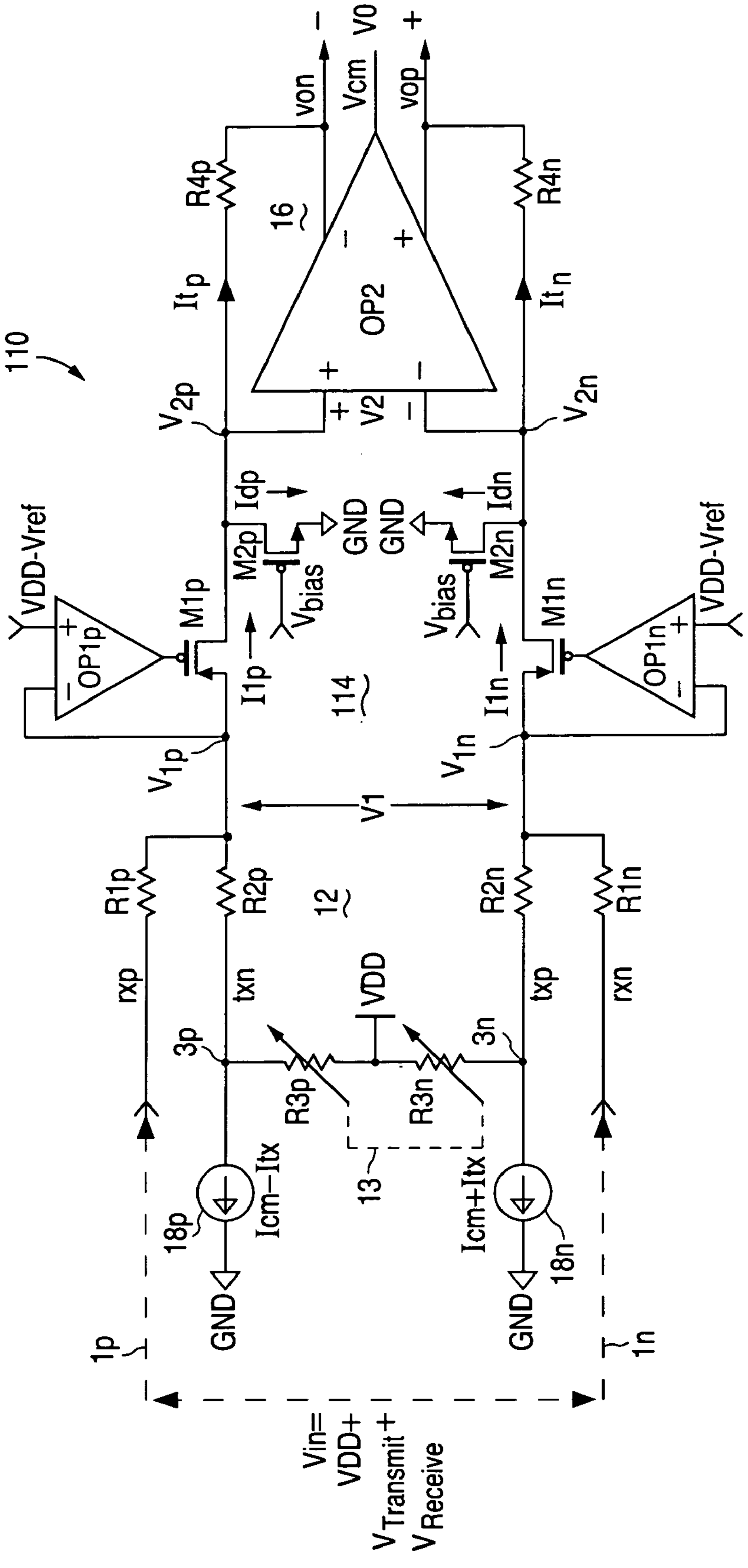
FIG. 2 is a schematic circuit diagram of a receiver circuit with excess DC current shunting.

Referring to FIG. 2, one technique that has been used to divert the excess DC current from the output stage 16 is implemented as a differential echo cancellation receiver circuit 110 which includes the receiver circuitry 10 of FIG. 1 plus the addition of current shunting transistors M2$p$, M2$n$ connected between circuit terminals V2$p$ and V2$n$ and circuit ground GND. With an appropriate bias voltage Vbias applied to the gate terminals of transistors M2$p$ and M2$n$, DC diversion currents Idp, Idn are shunted away from circuit terminals V2$p$, V2$n$ such that such diversion currents Idp, Idn are equal in magnitude to their respective DC current components of the positive I1$p$ and negative I1$n$ phases of the differential current I1 passing through the intermediate stage 114. However, such technique has relied upon fixed voltages for the bias voltage Vbias. Accordingly, as any portion of the overall circuitry 110 changes and affects the DC components of the positive lip and negative I1$n$ signal current phases, the diversion currents Idp, Idn being shunted away will not track the excess DC current, thereby causing the DC voltage V2 at the input terminals V2$p$, V2$n$ of the operational amplifier circuit OP2 to be other than zero.

Figure 3:
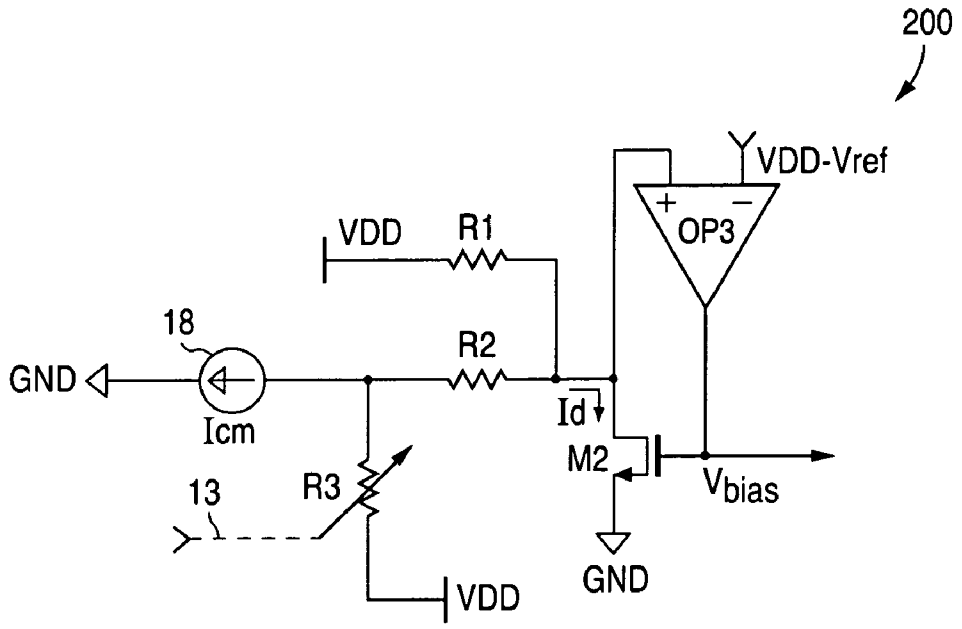
FIG. 3 is a schematic circuit diagram for a replica bias signal generator circuit for biasing a differential echo cancellation receiver circuit with excess DC current shunting in accordance with one embodiment of the presently claimed invention.

Referring to FIG. 3 in conjunction with FIG. 2, a more optimal solution is to ensure that the diversion currents Idp, Idn are sufficiently dynamic so as to consistently eliminate all excess DC current flowing into terminals V2$p$ and V2$n$. This is achieved by using a replica biasing circuit 200 to ensure that the biasing voltage Vbias tracks any changes in the DC current components of the positive p and negative I1$n$ phases of the differential signal current I1. This circuitry 200 includes an N-MOSFET M2 which is substantially identical to the shunting transistors M2$p$, M2$n$ and biased by an operational amplifier circuit OP3 at its drain and gate terminals, and a matrix of resistors R1, R2, R3 similar in topology to corresponding portions of the symmetric input circuit stage 12. Also similar to the input stage 12, these resistors R1, R2, R3 (with resistor R3 being controlled in conjunction with resistors R3$p$ and R3$n$, as discussed above) are also similarly biased by the power supply voltage VDD and the common mode signal current Icm. This results in a drain current Id through transistor M2 controlled by the operational amplifier OP3 in conformance with its input DC reference voltage VDD-Vref. Particularly in an integrated circuit environment in which the receiver circuitry 110 and biasing circuitry 200 are commonly integrated, any variations in system operating characteristics (e.g., operating temperature, variations in fabrication processes affecting the resistors or transistors, etc.) will affect the receiver circuitry 110 and biasing circuitry 200 in substantially identical ways. Accordingly, the biasing voltage Vbias will track such variations so as to cause the shunted currents Idp, Idn to track their respective DC components in the positive lip and negative I1$n$ current phases of the incoming signal current I1.

As indicated below, the current shunting transistors M2$p$, M2$n$ and replica biasing transistor M2 (that essentially performs a current-to-voltage conversion between its drain current ID and its gate voltage Vbias) are designed to be substantially identical (Equation 10).

$$M2p=M2n=M2 \tag{10}$$

Accordingly, with each transistor M2$p$, M2$n$, M2 operating in saturation, their output impedances (at their drain terminals) will be virtually infinite and their respective drain currents Idp, Idn, Id will be equal, as defined in accordance with Equation 11.

$$Id=\frac{Vref}{R1}+\frac{Vref}{R3+R2}-\frac{Icm\cdot R3}{R3+R2} \tag{11}$$

Therefore, the total current It can be computed in accordance with Equations 12 and 13.

$$It=It_{ac}+It_{dc}-Id \tag{12}$$

$$\begin{aligned}It&=\frac{Vin}{R1}+\frac{Vref}{R1}+\frac{Vref}{R3+R2}-\frac{Icm\cdot R3}{R3+R2}-\frac{Itx\cdot R3}{R3+R2}-\left(\frac{Vref}{R1}+\frac{Vref}{R3+R2}-\frac{Icm\cdot R3}{R3+R2}\right)\\&=\frac{Vin}{R1}-\frac{Itx\cdot R3}{R3+R2}\\&=It_{ac}\end{aligned} \tag{13}$$

Hence, the excess DC output current is cancelled, thereby forcing the voltage V2 at the input terminals of the output operational amplifier circuit OP2 to be equal to the common mode output voltage Vcmo, in accordance with Equation 14.

$$V_{2dc}=VCMO \tag{14}$$

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including differential echo cancellation receiver circuitry with dynamic cancellation of excess DC output current, comprising:

resistive input circuitry that responds to reception of a DC power voltage, a differential input signal, a common mode DC current and a differential replica signal current by providing a first intermediate differential signal, wherein said differential input signal includes a DC input signal component corresponding to said DC power voltage, a transmit signal component and a receive signal component, said differential replica signal current corresponds and is opposite in polarity to said transmit signal component, and said first intermediate differential signal includes a first differential signal current corresponding to said receive signal component and substantially zero transmit signal component, and first and second differential DC current phases, current control circuitry, coupled to said resistive input circuitry, that responds to reception of a DC reference voltage, a replica bias signal and said first intermediate differential signal by providing a second intermediate differential signal including a second differential signal current corresponding to said first differential signal current, and first and second shunt DC currents;

differential amplifier circuitry, coupled to said current control circuitry and including differential negative feedback circuitry coupled between first and second differential input terminals and first and second differential output terminals, that responds to reception of said second intermediate differential signal via said first and second differential input terminals by providing a corresponding differential output signal via said first and second differential output terminals; and bias signal generator circuitry, coupled to said current control circuitry, that responds to reception of said DC power voltage, said DC reference voltage, and a replica DC current substantially equal to said common mode DC current by providing said replica bias signal, wherein said replica bias signal tracks changes in said first and second differential DC current phases such that said first and second shunt DC currents are substantially equal to said first and second differential DC current phases, respectively.

2. The apparatus of claim 1, wherein said first and second differential input terminals and said first and second differential output terminals have substantially equal DC voltages.

3. The apparatus of claim 1, wherein said first intermediate differential signal further includes a substantially zero differential voltage.

4. The apparatus of claim 1, wherein said current control circuitry comprises;

a current control circuit, coupled between said resistive input circuitry and said differential amplifier circuitry, that responds to reception of said DC reference voltage and said first intermediate differential signal by providing said second intermediate differential signal; and a current shunting circuit, coupled to said current control circuit, that responds to reception of said replica bias signal by shunting said first and second shunt DC currents.

5. The apparatus of claim 1, wherein said differential amplifier circuitry comprises:

a differential operational amplifier circuit;

first resistive circuitry coupled between said first differential input terminal and said second differential output terminal; and second resistive circuitry coupled between said second differential input terminal and said first differential output terminal.

6. The apparatus of claim 1, wherein said bias signal generator circuitry comprises:

replica resistive circuitry that responds to reception of said DC power voltage and said replica DC current by providing a DC reference current; and current-to-voltage conversion circuitry, coupled to said replica resistive circuitry and said current control circuitry, that responds to reception of said DC reference current by providing said replica bias signal.

7. The apparatus of claim 1, further comprising current source circuitry, coupled to said resistive input circuitry, to provide said common mode DC current and said differential replica signal current.

8. An apparatus including differential echo cancellation receiver circuitry with dynamic cancellation of excess DC output current, comprising:

a power terminal to convey a DC power voltage;

first and second input terminals to convey a differential input signal including a DC input signal component corresponding to said DC power voltage, a transmit signal component and a receive signal component;

differential input circuitry, coupled to said power terminal and said first and second input terminals, that responds to reception of said DC power voltage, said differential input signal, a common mode DC current, and a differential replica signal current corresponding and opposite in polarity to said transmit signal component by providing a first intermediate differential signal including a first differential signal current corresponding to said receive signal component and substantially zero transmit signal component, and first and second differential DC current phases;

current cancellation circuitry, coupled to said differential input circuitry, that responds to reception of a DC reference voltage, a replica bias signal and said first intermediate differential signal by providing a second intermediate differential signal including a second differential signal current corresponding to said first differential signal current, and third and fourth differential DC current phases;

differential amplifier circuitry, coupled to said current cancellation circuitry and including differential negative feedback circuitry coupled between first and second differential input terminals and first and second differential output terminals, that responds to reception of said second intermediate differential signal via said first and second differential input terminals by providing a corresponding differential output signal via said first and second differential output terminals; and bias signal generator circuitry, coupled to said power terminal and said current cancellation circuitry, that responds to reception of said DC power voltage, said DC reference voltage, and a replica DC current substantially equal to said common mode DC current by providing said replica bias signal, wherein said replica bias signal tracks changes in said first and second differential DC current phases such that said third and fourth differential DC current phases are substantially zero.

9. The apparatus of claim 8, wherein said first and second differential input terminals and said first and second differential output terminals have substantially equal DC voltages.

10. The apparatus of claim 8, wherein said first intermediate differential signal further includes a substantially zero differential voltage.

11. The apparatus of claim 8, wherein said current cancellation circuitry responds to reception of said replica bias signal by shunting first and second DC cancellation currents substantially equal to said first and second differential DC current phases, respectively.

12. The apparatus of claim 8, wherein said differential input circuitry comprises a symmetric matrix of resistive circuit elements coupled between said power terminal and said first and second input terminals.

13. The apparatus of claim 8, wherein said current cancellation circuitry comprises;

current control circuitry, coupled between said differential input circuitry and said differential amplifier circuitry, that responds to reception of said DC reference voltage and said first intermediate differential signal by providing said second intermediate differential signal; and current shunting circuitry, coupled to said current control circuitry, that responds to reception of said replica bias signal by shunting first and second DC diversion currents substantially equal to said first and second differential DC current phases, respectively.

14. The apparatus of claim 8, wherein said differential amplifier circuitry comprises:

a differential operational amplifier circuit;

first resistive circuitry coupled between said first differential input terminal and said second differential output terminal; and second resistive circuitry coupled between said second differential input terminal and said first differential output terminal.

15. The apparatus of claim 8, wherein said bias signal generator circuitry comprises:

replica input circuitry, coupled to said power terminal, that responds to reception of said DC power voltage and said replica DC current by providing a DC reference current; and current-to-voltage conversion circuitry, coupled to said replica input circuitry and said current cancellation circuitry, that responds to reception of said DC reference current by providing said replica bias signal.

16. The apparatus of claim 8, further comprising current source circuitry, coupled to said differential input circuitry, to provide said common mode DC current and said differential replica signal current.

17. An apparatus including differential echo cancellation receiver circuitry with dynamic cancellation of excess DC output current, comprising:

resistive input means for receiving a DC power voltage, a differential input signal; a common mode DC current and a differential replica signal current and in response thereto generating a first intermediate differential signal, wherein said differential input signal includes a DC input signal component corresponding to said DC power voltage, a transmit signal component and a receive signal component, said differential replica signal current corresponds and is opposite in polarity to said transmit signal component, and said first intermediate differential signal includes a first differential signal current corresponding to said receive signal component and substantially zero transmit signal component, and first and second differential DC current phases, current controller means for receiving a DC reference voltage, a replica bias signal and said first intermediate differential signal and in response thereto generating a second intermediate differential signal including a second differential signal current corresponding to said first differential signal current, and first and second shunt DC currents;

differential amplifier means for receiving said second intermediate differential signal and in response thereto generating a corresponding differential output signal; and bias signal generator means for receiving said DC power voltage, said DC reference voltage, and a replica DC current substantially equal to said common mode DC current and in response thereto generating said replica bias signal, wherein said replica bias signal tracks changes in said first and second differential DC current phases such that said first and second shunt DC currents are substantially equal to said first and second differential DC current phases, respectively.

18. The apparatus of claim 17, further comprising current source means for generating said common mode DC current and said differential replica signal current.

19. An apparatus including differential echo cancellation receiver circuitry with dynamic cancellation of excess DC output current, comprising:

differential input means for receiving a DC power voltage, a differential input signal, a common mode DC current and a differential replica signal current and in response thereto generating a first intermediate differential signal, wherein said differential input signal includes a DC input signal component corresponding to said DC power voltage, a transmit signal component and a receive signal component, said differential replica signal current corresponds to and is opposite in polarity to said transmit signal component, and said first intermediate differential signal includes a first differential signal current corresponding to said receive signal component and substantially zero transmit signal component, and first and second differential DC current phases, current cancellation means for receiving a DC reference voltage, a replica bias signal and said first intermediate differential signal and in response thereto generating a second intermediate differential signal including a second differential signal current corresponding to said first differential signal current, and third and fourth differential DC current phases;

differential amplifier means for receiving said second intermediate differential signal and in response thereto generating a corresponding differential output signal; and bias signal generator means for receiving said DC power voltage, said DC reference voltage, and a replica DC current substantially equal to said common mode DC current and in response thereto generating said replica bias signal, wherein said replica bias signal tracks changes in said first and second differential DC current phases such that said third and fourth differential DC current phases are substantially zero.

20. The apparatus of claim 19, further comprising current source means for generating said common mode DC current and said differential replica signal current.

* * * * *

UNITED STATES PATENT AND TRADEMARK OFFICE

CERTIFICATE OF CORRECTION

PATENT NO. : 6,973,182 B1
DATED : December 6, 2005
INVENTOR(S) : Arlo Aude

It is certified that error appears in the above-identified patent and that said Letters Patent is hereby corrected as shown below:

<u>Column 1,</u>
Line 66, delete "Mn" and insert -- M1n --.

<u>Column 2,</u>
Line 6, delete "Mn" and insert -- M1n --.

<u>Column 5,</u>
Line 60, delete "lip" and insert -- I1p --.

<u>Column 6,</u>
Line 4, delete "lip" and insert -- I1p --.

Signed and Sealed this

Thirty-first Day of January, 2006

JON W. DUDAS
*Director of the United States Patent and Trademark Office*